US012367696B2

(12) United States Patent
Hsu et al.

(10) Patent No.: US 12,367,696 B2
(45) Date of Patent: Jul. 22, 2025

(54) SYSTEMS AND METHODS FOR DOCUMENT AUTHENTICATION

(71) Applicant: Idemia Identity & Security USA LLC, Reston, VA (US)

(72) Inventors: Rein-Lien Hsu, Edison, NJ (US); Brian Martin, McMurray, PA (US); Alexandru Bogdan, New York, NY (US)

(73) Assignee: IDEMIA PUBLIC SECURITY FRANCE, Courbevoie (FR)

(*) Notice: Subject to any disclaimer, the term of this patent is extended or adjusted under 35 U.S.C. 154(b) by 295 days.

(21) Appl. No.: 18/066,655

(22) Filed: Dec. 15, 2022

(65) Prior Publication Data

US 2024/0203145 A1 Jun. 20, 2024

(51) Int. Cl.
*G06V 30/418* (2022.01)
*G06V 30/148* (2022.01)
*G06V 30/18* (2022.01)
*G06V 30/19* (2022.01)
*G06V 30/42* (2022.01)

(52) U.S. Cl.
CPC ...... *G06V 30/19013* (2022.01); *G06V 30/148* (2022.01); *G06V 30/18105* (2022.01); *G06V 30/42* (2022.01)

(58) Field of Classification Search
CPC .............................................. G06V 30/00–43
See application file for complete search history.

(56) References Cited

U.S. PATENT DOCUMENTS

| 8,731,234 | B1* | 5/2014 | Ciarcia | G06V 30/19173 |
| | | | | 382/155 |
| 9,280,649 | B2* | 3/2016 | Matsuda | G06V 40/10 |
| 2004/0208372 | A1* | 10/2004 | Boncyk | H04N 1/00068 |
| | | | | 707/E17.023 |
| 2008/0025555 | A1* | 1/2008 | Visan | G06V 30/19013 |
| | | | | 382/100 |
| 2009/0141986 | A1* | 6/2009 | Boncyk | A63F 13/70 |
| | | | | 382/209 |

(Continued)

OTHER PUBLICATIONS

Park, Du-Sik et al. "Image Indexing Using Color Histogram in the Cieluv Color Space.", 7 pages (2007).

(Continued)

*Primary Examiner* — Sean T Motsinger
(74) *Attorney, Agent, or Firm* — Armstrong Teasdale LLP

(57) ABSTRACT

A system for authenticating a subject identification document includes instructions causing a processor to receive a first image of the document, depicting, in RGB color space, the document illuminated by UV light, and transform the first image to a second image in YCbCr color space. The instructions cause the processor to divide the second image into regions of interest (ROIs), and, for each ROI, generate a color profile descriptor including first data elements associated with pixel color in the YCbCr color space, and second data elements associated with pixel intensity of pixels within the ROI. The instructions also cause the processor to generate a score for the second image based on a comparison of the color profile descriptor for each ROI to a corresponding ROI of an enrolled document template, and compare the score to a threshold to determine whether the document is authenticated.

20 Claims, 4 Drawing Sheets

(56) References Cited

U.S. PATENT DOCUMENTS

| | | | | |
|---|---|---|---|---|
| 2010/0008581 | A1* | 1/2010 | Bressan | G06V 30/2264 |
| | | | | 382/177 |
| 2011/0034176 | A1* | 2/2011 | Lord | G06V 10/96 |
| | | | | 348/241 |
| 2011/0211760 | A1* | 9/2011 | Boncyk | G06T 7/11 |
| | | | | 382/218 |
| 2017/0132866 | A1* | 5/2017 | Kuklinski | G07D 7/2083 |
| 2023/0063441 | A1* | 3/2023 | Kramer | G16H 80/00 |
| 2023/0069960 | A1* | 3/2023 | Mahadevan | G06T 7/11 |
| 2023/0281821 | A1* | 9/2023 | Pizzocchero | G06V 10/22 |
| | | | | 382/100 |
| 2024/0203145 | A1* | 6/2024 | Hsu | G06V 30/19013 |
| 2024/0203150 | A1* | 6/2024 | Hsu | G06V 30/148 |

OTHER PUBLICATIONS

S. Jeong, C.S. Won, and R.M. Gray, "Image Retrieval Using Color Histograms Generated by Gauss Mixture Quantization", CVIU, No. 94, pp. 44-66, 2004.

Monica Gariup, Jakub Piskorski, The challenge of detecting false documents at the border: Exploring the performance of humans, machines and their interaction, International Journal of Critical Infrastructure Protection, vol. 24, 2019, pp. 100-110, ISSN 1874-5482.

Daptardar, Ajay & Storer, James. (2008). VQ Based Image Retrieval Using Color and Position Features. Data Compression Conference Proceedings. 432-441. 10.1109/DCC.2008.106.

Popescu, Alin & Farid, Hany. (2004). Statistical Tools for Digital Forensics. Lecture Notes Comput. Sci.. 3200. 10.1007/978-3-540-30114-1_10.

R.E. Yancey, N. Matloff, and P. Thompson, "Multi-Stream Faster RCNN With ELA for Image Tampering Detection," CVPR 2019. < https://arxiv.org/abs/1904.08484 >.

P. Zhou, X. Han, V.I. Morariu, and L.S. Davis, "Learning Rich Features for Image Manipulation Detection," CVPR 2018. < https://ieeexplore.ieee.org/document/8578214 > < https://arxiv.org/abs/1805.04953 >.

S.Y. Wang, O. Wang, A. Owens, R. Zhang, and A.A. Efros, "Detecting Photoshopped Faces by Scripting Photoshop," CCV 2019. < https://arxiv.org/pdf/1906.05856.pdf >.

European Extended Search Report, Application No. 23216071.3, dated Apr. 19, 2024, 10 pps.

Michael Elad et al., "Low Bit-Rate Compression of Facial Images", IEEE Transactions on Image Processing, vol. 16, No. 9, Sep. 2007, pp. 2379-2383.

Marwa B. Al-Obaidi et al., "Passport Photo Compression: A Review", Journal of Al-Qadisiyah for Computer Science and Mathematics, vol. 14, No. 3, Aug. 15, 2022, pp. 112-119.

Wei-Min Zheng et al., "Color Image Retrieval Schemes Using Index Histograms Based On Various Spatial-Domain Vector Quantizers", International Journal of Innovative Computing, Information and Control, vol. 2, No. 6, Dec. 2006, pp. 1317-1326.

* cited by examiner

SYSTEMS AND METHODS FOR DOCUMENT AUTHENTICATION

FIELD

The field of the disclosure relates generally to systems and methods for document authentication and feedback, and more specifically, to systems and methods for authentication of a document using ultraviolet (UV) illumination of the document.

BACKGROUND

Some traditional document validation systems verify a credential document, such as a physical driver's license, a passport, or another form of identification document, contains valid information. For example, some conventional systems may verify the information contained by a driver's license presented to a law enforcement or security officer is valid, inasmuch, for example, as the driver's license itself is not a fraudulent document.

In many instances, documents are authenticated or validated merely by the human eye. That is, continuing with the above example, the law enforcement or security officer looks at the document and decides its authenticity. It is also known to use certain authentication devices in addition to the naked eye, such as devices to illuminate various embedded security features. It is recognized that these authentication methods are vulnerable to human error.

In some other instances, documents are authenticated with machine aid. For example, various scanners, cameras, and other imaging devices with authentication capabilities are known. In some cases, however, such computer-based document authentication devices implement simple pattern matching or feature identification processes. These processes may not be as robust as desired. Moreover, variations between devices as well as inconsistencies in valid documents (such as age, fading, wear and tear, and the like) can lead to false negatives, or the (erroneous) determination that a valid document is invalid.

Authentication systems and methods that overcome human error as well as device and document inconsistencies are desirable.

BRIEF DESCRIPTION

In one aspect, a system for authenticating a subject identification document is provided. The system includes a memory including a first memory section storing computer-executable instructions and a second memory section storing a plurality of enrolled document templates, as well as a processor in communication with the memory and configured to execute the computer-executable instructions. When executed, the computer-executable instructions cause the processor to receive a first image of the subject identification document, the first image depicting, in a red-green-blue (RGB) color space, the subject identification document illuminated by ultraviolet (UV) light, transform the first image of the subject identification document to a second image of the subject document in a YCbCr color space, and divide the second image into a plurality of regions of interest (ROIs). The computer-executable instructions also cause the processor to, for each ROI, generate a color profile descriptor including first data elements associated with a number of pixels in each of a plurality of angular sectors in a CbCr color map of the YCbCr color space, within the corresponding ROI, and second data elements associated with pixel intensity of the pixels within the corresponding ROI. The computer-executable instructions further cause the processor to generate a matching score for the second image based on a comparison of the color profile descriptor for each ROI to a corresponding ROI of a first enrolled document template, and compare the matching score to a threshold to determine whether the subject identification document is authenticated.

In another aspect, a non-transitory, computer readable storage medium having a first memory section storing a plurality of enrolled document templates and a second memory section having instructions stored thereon is provided. In response to execution by a processor, the computer-executable instructions cause the processor to receive a first image of a subject identification document, the first image depicting, in a red-green-blue (RGB) color space, the subject identification document illuminated by ultraviolet (UV) light, and transform the first image of the subject identification document to a second image of the subject identification document in a YCbCr color space. The computer-executable instructions also cause the processor to divide the second image into a plurality of regions of interest (ROIs), and, for each ROI, generate a color profile descriptor including first data elements associated with a number of pixels in each of a plurality of angular sectors in a CbCr color map of the YCbCr color space, within the corresponding ROI, and second data elements associated with pixel intensity of the pixels within the corresponding ROI. The computer-executable instructions further cause the processor to generate a matching score for the second image based on a comparison of the color profile descriptor for each ROI to a corresponding ROI of a first enrolled document template, and compare the matching score to a threshold to determine whether the subject identification document is authenticated.

In yet another aspect, a computer-implemented method for authenticating a subject identification document is provided. The method is implemented using an authentication system including (i) a memory storing a plurality of enrolled document templates, and (ii) a processor in communication with the memory. The method includes receiving a first image of the subject identification document, the first image depicting, in a red-green-blue (RGB) color space, the subject identification document illuminated by ultraviolet (UV) light, and transforming the first image of the subject identification document to a second image of the subject identification document in a YCbCr color space. The method also includes dividing the second image into a plurality of regions of interest (ROIs), and, for each ROI, generating a color profile descriptor including first data elements associated with a number of pixels in each of a plurality of angular sectors in a CbCr color map of the YCbCr color space, within the corresponding ROI, and second data elements associated with pixel intensity of the pixels within the corresponding ROI. The method further includes generating a matching score for the second image based on a comparison of the color profile descriptor for each ROI to a corresponding ROI of a first enrolled document template, and comparing the matching score to a threshold to determine whether the subject identification document is authenticated.

DETAILED DESCRIPTION

Figure 1:
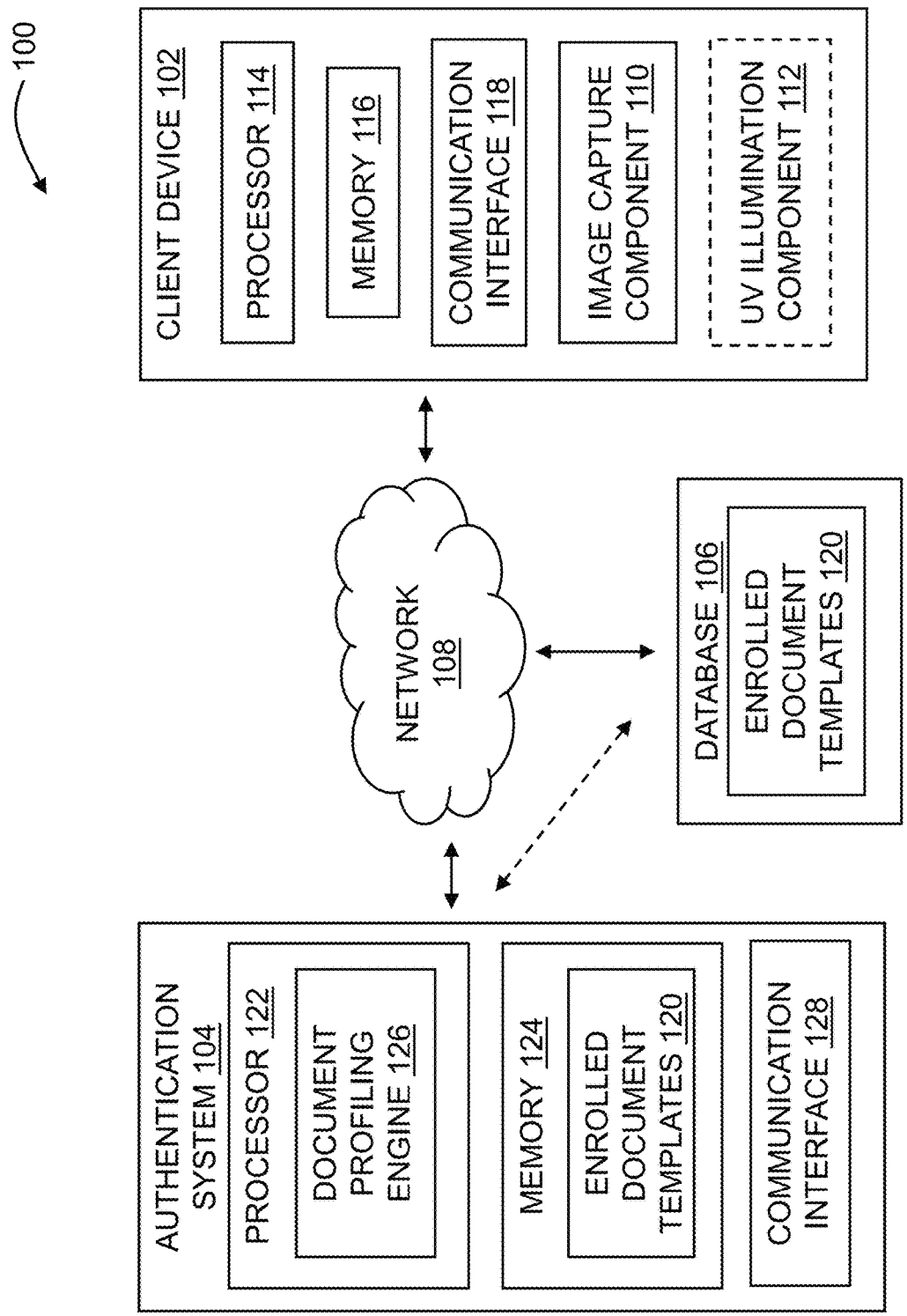
FIG. 1 is a block diagram illustrating an example embodiment of a system for document authentication and validation.

The disclosed systems and methods provide for improved authentication or validation of subject documents, in particular, credential documents. These systems and methods may be implemented in locations where in-person document authentication is regularly and repeatedly performed, such as at security checkpoints (airports, border crossings, government buildings, etc.).

In the example embodiment, an authentication system includes a document profiling engine employed to analyze documents according to the methods described herein. The document profiling engine may be embodied in computer-executable instructions executable by one or more processors of one or more local or remote computing devices. The document profiling engine executes these instructions to build a library of enrolled document templates of a plurality of documents—passports, driver's licenses, and the like—from any number of jurisdictions. For example, the library includes templates for enrolled documents such as U.S. passports, E.U. passports, New Jersey driver's licenses, Illinois state identification cards, and any other official credential documents. As explained herein, the templates do not include portraits or personally identifiable information (PII) but rather represent the appearance of such a document before (or in the absence of) personalization. The library of enrolled document templates includes any number of enrolled document templates, or templates generated during an enrollment process for a known valid representation of a credential document. While this disclosure provides examples relative to government-issued credential documents, the systems and methods are equally applicable to privately issued credential documents, such as identification badges and the like.

These enrolled document templates are generated based on images of the known valid credential documents (enrollment documents) as each enrollment document is illuminated by ultraviolet (UV) light. The document profiling engine receives these images and processes them, as described herein, to generate the templates representing each document as a respective plurality of data elements or values for storage with low memory requirements and efficient, effective comparison. Additionally, as described in greater detail below, the document profiling engine executes similar processing on images of credential documents subject to authentication (subject documents) to generate subject templates for comparison to the stored enrolled document templates for authentication of the subject document. Accordingly, the following description of the analyses performed by the document profiling engine employs the term "document," which can apply equally to enrollment documents and subject documents.

An image of the document is captured using an image capture device. More particularly, according to disclosed embodiments, the document is illuminated using UV light, and the image of the document is captured. The image capture device is a scanner, in many implementations, as image scanners often have UV illumination components as well as image capture components installed therein. However, in certain embodiments, the image capture device may be separate from the UV illumination component. For example, a standalone UV light, such as a handheld UV flashlight, may be used to illuminate the document, and an image capture device such as a standalone camera or mobile phone may be used to capture the image of the document. Other image capture devices may be used without departing from the scope of the present disclosure.

The image of the document illuminated by UV light may be referred to herein as a "first image" or a "UV image," although it should be understood that such a "UV image" is a digital image in the visible color spectrum, as interpretable by the human eye. In particular, the first image is captured in a first color space, known in the relevant art as the RGB (red-green-blue) color space. The document profiling engine receives the first image in the RGB color space and performs initial processing steps thereon. In one example embodiment, the document profiling engine performs optical character recognition (OCR) and portrait detection on the first image, to identify text and portrait(s) on the image. The document profiling engine is configured to mask personalized features of the document represented in the first image, such as the portrait and any personal information specific to the subject of the credential, as these features are not useful for this disclosed type of authentication of the document as valid (or non-fraudulent). Thereafter, the first image is normalized. In particular, the first image is flattened and re-sized. The personalized features are masked (e.g., the pixels of the personalized features are set to some predefined high or low mask value) in these processing steps and/or are otherwise disregarded in subsequent processing steps.

The normalized first image is divided into a plurality of regions of interest (ROIs), and each of these ROIs is analyzed and characterized with a corresponding "color profile descriptor," as described further herein. This division enables individual ROIs to be validated (e.g., identified as suitable for comparison/matching) or invalidated (e.g., identified as unsuitable for comparison/matching) according to various thresholds. Moreover, documents can be authenticated by comparing corresponding ROIs according to their color profile descriptors in a non-resource intensive, efficient, and fast manner.

To generate the color profile descriptor for a particular ROI, the document profiling engine first translates or transforms the first image, in which the UV-illuminated document is represented in the first (RGB) color space, to a second image of the document represented in a second color space, known in the relevant art as YCbCr color space. In general, this color space defines each pixel with a three-dimensional polar coordinate [Y, Cb, Cr], where "Y" generally represents the intensity or luminance of the pixel and [Cb, Cr] together represent chroma (color) components of the pixel. Analyzing the UV-illuminated document in this second color space is advantageous, because the color information can be separated from the intensity information for further processing.

Using the second image in the second color space, the document profiling engine determines an average pixel intensity for each ROI, as well as a maximum and minimum pixel intensity for each ROI. The average pixel intensity of an ROI under analysis is compared to a dark-noise threshold, which represents a minimum intensity of an image, below which little to no useful information can be recovered from the image pixels. In some embodiments, the dark-noise threshold may be dynamically adjusted during processing. Additionally, the document profiling engine compares the average pixel intensity for the ROI to a saturation threshold, which represents a maximum intensity of an image, above which little to no useful information can be recovered from the image pixels. If the average pixel intensity for an ROI falls outside of this range (i.e., is not between the dark-current threshold and the saturation threshold), the ROI may be considered invalid for further processing. For instance, this ROI may depict a region of the document that has been over-saturated during image capture or, in contrast, is too shadowed. This thresholding enables processing of documents across a wide variety of imaging devices, which may have different illumination properties, and accounts for variations in image capture.

The document profiling engine then validates the pixels in each ROI. More specifically, the document profiling engine generates a mask (which is separate from the above-described mask that removes personalized information from processing) based on the dark-current threshold and the saturation threshold, which masks, or eliminates from further processing, individual pixels that fall outside of this range. If the count of valid pixels remaining in an ROI exceeds a predefined threshold, the ROI is further validated.

In each valid ROI, for each valid pixel, the color of each pixel is mapped to a two-dimensional [Cb, Cr] color plane (that is, where "Y" is considered a constant and is disregarded with respect to pixel color). This two-dimensional [Cb, Cr] color plane is divided into a plurality of angular sectors relative to a [0,0] origin on the [Cb, Cr] color plane. When a pixel is mapped to this color plane, based on its [Cb, Cr] color, it has a two-coordinate hue-angle representation located within one of these angular sectors of the color plane.

The document profiling engine is configured to characterize each ROI based on the number of pixels, within the ROI, that falls into each of the angular sectors of the color plane. More specifically, the document profiling engine increments a bin of a polar histogram corresponding to the angular sector of the pixel mapped to the [Cr, Cb] color plane. Each ROI therefore is associated with a unique polar histogram based on how many pixels are in each sector of the color plane. In one example embodiment, each ROI is thereby described or characterized in part by its resulting polar histogram. The document profiling engine translates the polar histogram into a plurality of first data elements (e.g., an array of the increment values in each angular sector of the polar histogram). The color profile descriptor for the ROI includes these first data elements.

In one example embodiment, the color profile descriptor for an ROI also includes second data elements, which represent intensity information associated with the ROI. The second data elements may include one or more of: average pixel intensity, maximum intensity, and minimum intensity for the ROI. Accordingly, the color profile descriptor for an ROI includes first and second data elements that collectively describe and characterize the color and intensity of an ROI.

It follows that the entire document may be readily characterized in part by concatenating the color profile descriptors for all (valid) ROIs in the document. That is, the document template associated with and describing the document includes all color profile descriptors for the valid ROIs therein. In some embodiments, an enrolled document template is generated based upon analyses of multiple images of a document to be enrolled, such that the enrolled document template represents an average or exemplar enrolled document for future comparison. In some embodiments, the color profile descriptors of ROIs in an enrolled document template may not include some or all of the intensity information associated with an enrolled document. For instance, any variance in intensity may be accounted for in the averaging or combining of analyses.

In further operation, the document profiling engine performs the above analysis on an image of a subject document, and the resulting subject document template is compared to the library of enrolled document templates to determine whether the subject document is authenticated or validated. To perform this comparison, the document profile engine retrieves an enrolled document template from the library of enrolled document templates. The enrolled document template corresponds to a type or jurisdiction class of the subject document. Specifically, given a query image of a document (e.g., a subject document), the document profiling engine detects the jurisdiction associated with the document, and then classifies it into one or more known jurisdiction classes (i.e., associated with a classification code). The enrolled document templates templates are enrolled and indexed by such a classification code. Based on such a classification code, the document profiling engine can select/retrieve the corresponding enrolled document template ("profile templates").

The document profiling engine then computes a matching score between the enrolled document template and the subject document template. Specifically, the document profiling engine computes a matching score for each pair of corresponding ROI. That is, the document profiling engine uses respective color profile descriptors to compare the histogram of an ROI in the subject document template to the histogram of the corresponding ROI in the enrolled document template. The area of overlap between the two histograms is normalized to generate an initial normalized match value. Subsequently, the document profile engine calculates a difference between the maximum intensity and minimum intensity of the ROI and subtracts this different from the initial normalized match value. The resulting scores for all ROIs is then sorted in increasing order.

One or more of the top scores and one or more of the bottom scores are removed from further comparison. This step enhances the accuracy of the authentication process by removing outlier ROIs, which may result from imaging device inconsistencies and/or variations in image quality. In some instances, because UV illumination of a document may result more frequently in over-saturated ROIs, there may be multiple ROI pairs with a score of zero; in these instances, all scores of zero are removed from further comparison.

When the number of remaining scores, after this elimination step, exceeds a predefined threshold, the document profiling engine computes the mean of the remaining scores. This value is the overall matching score between the subject document template and the enrolled document template. The document profile engine compares the matching score to a predefined score threshold to determine if the subject document passes or fails—that is, whether the subject document is authenticated or not.

The authentication process described herein, as implemented by the document profiling engine, may be one "module" in an overall authentication scheme of the authentication system including additional authentication modules or processes. The process described herein may be implemented in an overall authentication scheme to improve the accuracy of the document authentication and/or reduce the incidence of false negatives (i.e., erroneous determinations that a valid document is invalid). Notably, this authentication process does not require much resource utilization and can be performed quickly and efficiently, so the incorporation of this authentication process into an overall authentication scheme may be advantageous.

Additionally, although the authentication process of the present disclosure is described and shown with respect to images of UV-illuminated documents, similar processes may be implemented using images of documents captured under "normal" light, or within the visible spectrum of light. Color profile descriptors of ROIs may be generated in much the same way as described above, although intensity information would typically not be very useful. Therefore, color profile descriptors of ROIs in images of documents illuminated by the visible spectrum of light may not include intensity information. The comparisons of resulting templates may still be, on the whole, fairly accurate, but may lack the additional precision (and improved performance) associated with the additional computations involving intensity information.

In alternative embodiments, a standard or rectangular histogram may be employed instead of the polar histogram described above. Notably, it has been determined in the conception of the present disclosure that the polar histograms shown and described herein provide greater granularity and precision to the resulting ROI color profile descriptors, and therefore can be employed to generate more accurate results in subsequent matching/validation processes.

Moreover, it should be understood that any values and thresholds described herein may be different in various implementations of the document profiling engine, or even in different instances of the authentication process performed by a same document profiling engine. The example values, thresholds, and computations provided herein may optimize the precision and accuracy of the authentication determinations, but the disclosed systems and methods may operate with various other parameters without departing from the scope of the disclosure. The examples that follow, with respect to the figures, are illustrative and should not be construed in a limiting manner.

As used herein, the term "user credential" or "credential" may include any physical form of credential document, identification, or other documentation associated with a user that may be used to identify the user. For example, in at least some embodiments, user credentials may include any form of photo identification (photo ID), such as a driver's license, passport, or other government or non-government issued photo ID. In some embodiments, user credentials may include permissions and privileges (e.g., not just identity attributes such as a "driving privilege" or "right to hunt/fish in a specific location"). For example, data shared from a user credential may be data received from one or more issuing authorities. As an example, data stored in the user credential may be received from a Department of Motor Vehicles (DMV) and a local hospital (e.g., examples of data stored in the user credential include DMV portrait, DMV first name, DMV last name, DMV document number, Hospital driver license number, Hospital first name, Hospital last name, Hospital covid-19 vaccine name, Hospital covid-19 vaccination date). Likewise, in some embodiments, user credentials may include transaction instruments, such as payment cards (e.g., credit and debit cards). In some embodiments, a user credential may include a plurality of user credentials.

FIG. 1 is a block diagram illustrating an example embodiment of a system 100 for authenticating credential documents, in particular, using images of credential documents illuminated with UV light. In the example embodiment, system 100 includes a client device 102, an authentication system 104, and a database 106.

In the example embodiment, client device 102 may be any device capable of capturing an image of a credential document illuminated by UV light, including enrollment documents and subject documents. In particular, client device 102 is operated by a user at a location where document authentication is regularly performed, such as a checkpoint or border crossing. Client device 102 may include a scanner or other purpose-built image capture device. In other embodiments, client device 102 includes a personal computing device, such as a mobile smart phone, tablet, laptop computer, and the like. Accordingly, client device 102 includes an image capture component 110, such as a scanning component, one or more cameras, and the like. In at least some embodiments, client device 102 also includes an onboard UV illumination component 112, including one or more static or moveable UV lights or lamps. In some other embodiments, UV illumination component 112 is a separate hardware component from client device 102, such as a separate stationary or handheld UV lamp or flashlight.

Client device 102 further includes a processor 114, a memory 116, and a communication interface 118. As described herein, processor 114 executes instructions stored on memory device 116 to implement one or more processes, or portions of processes, for validation and/or authentication, as described herein. In the example embodiment, client device 102 employs communication interface 118 to transmit image(s) of document(s) to authentication system 104 for processing and enrollment or authentication. Communication interface 118 may be any wired and/or wireless communication interface that facilitates communication between client device 102 and system 104 over a network 108, where network 108 may include a wide-area-network, a local-area-network, the internet, and/or any other collection of networked computing devices. In some embodiments, communication interface 118 may also facilitate wireless communications using any of a variety of wireless protocols, such as WiFi, BLUETOOTH, cellular, NFC, and/or other protocol(s) in the radio frequency (RF) spectrum.

Authentication system 104 may be a computer system that facilitates (i) generation of a library of enrolled document templates 120, as well as (ii) authentication of a subject credential document by comparing a subject document template to one or more enrolled document templates 120. Authentication system 104 includes a processor 122 and a memory device 124. As described herein, processor 122 executes instructions stored on memory device 124 to implement one or more processes, or portions of processes, for document authentication. In particular, processor 122 executes instructions to implement document profiling engine 126, as described herein.

Authentication system 104 also includes a communication interface 128 for communication, via network 108, with client device 102. For example, authentication system 104 receives image(s) for document authentication from and transmits the results of that authentication to client device 102, via communication interface 128.

In some embodiments, authentication system 104 (e.g., via document profiling engine 126) generates enrolled document templates 120 as described herein, and locally stores enrolled document templates 120 on memory device 124. When enrolled document templates 120 are stored locally, authentication system 104 may include multiple memory devices and/or multiple memory sections within memory device 124 for appropriate data storage. Additionally or alternatively, authentication system 104 stores enrolled document templates 120 in a separate database 106. Authentication system 104 may communicate with database 106 via network 108 to retrieve enrolled document templates 120. In some instances, authentication system 104 stores the entire library of enrolled document templates 120 in database 106, and retrieves one or more enrolled document templates 120 for local (cached) storage within memory device 124 during document authentication processes. This local storage may improve processing time for comparison of templates locally at document profiling engine 126 (or another device, such a mobile computing device 102, co-located with authentication system 104).

Figure 2:
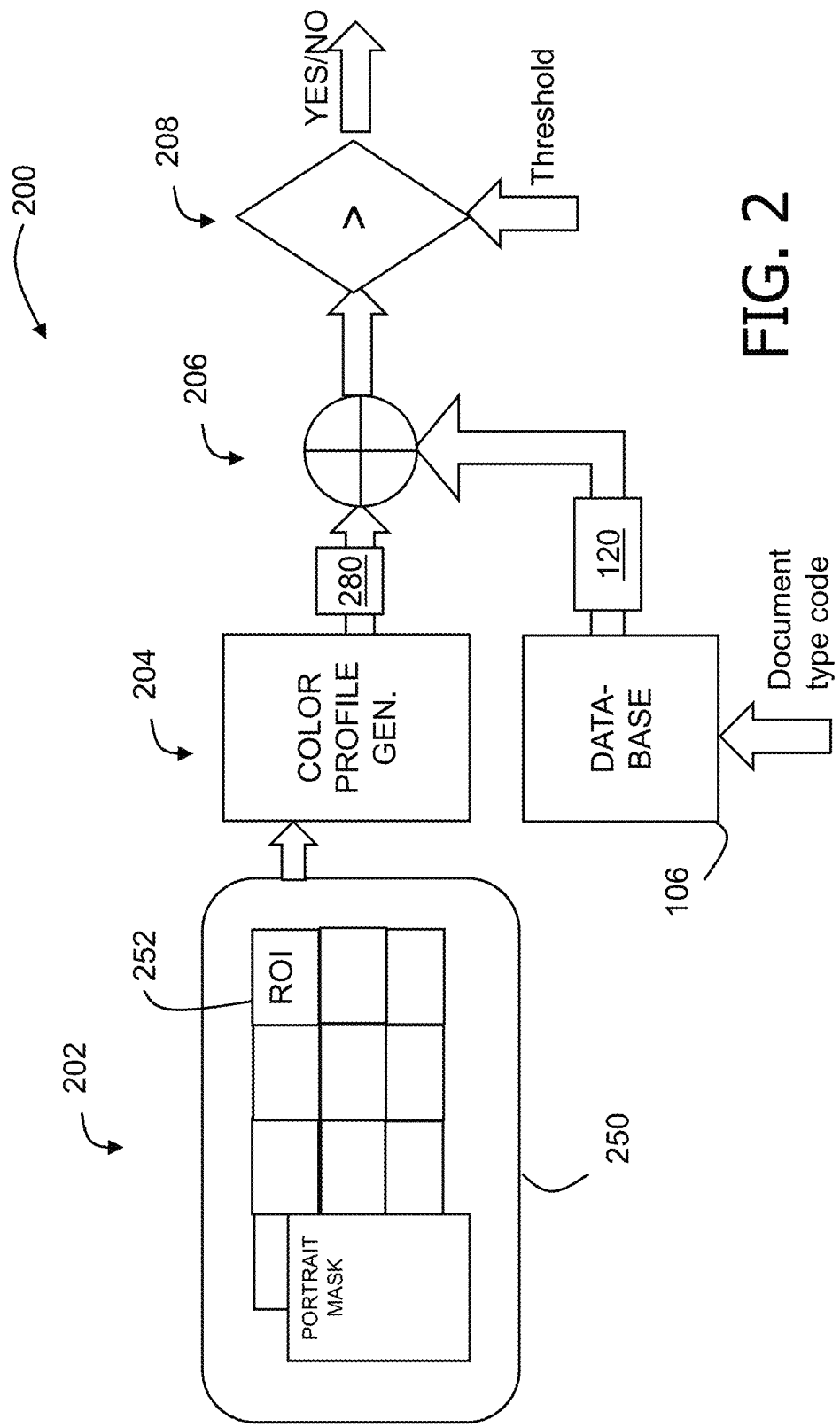
FIG. 2 is a schematic block diagram illustrating an example embodiment of a process for document authentication.

FIG. 2 is a schematic block diagram illustrating an example embodiment of a process 200 for document authentication using system 100 shown in FIG. 1. Document profiling engine 126 (shown in FIG. 1) may implement process 200, or portions thereof, in accordance with the present disclosure.

Document profiling engine 126 receives (202) a first image 250 of a subject document (e.g., a driver's license, passport, etc.). First image 250 depicts the subject document in a first, RGB color space, as illuminated by UV light.

Figure 3:
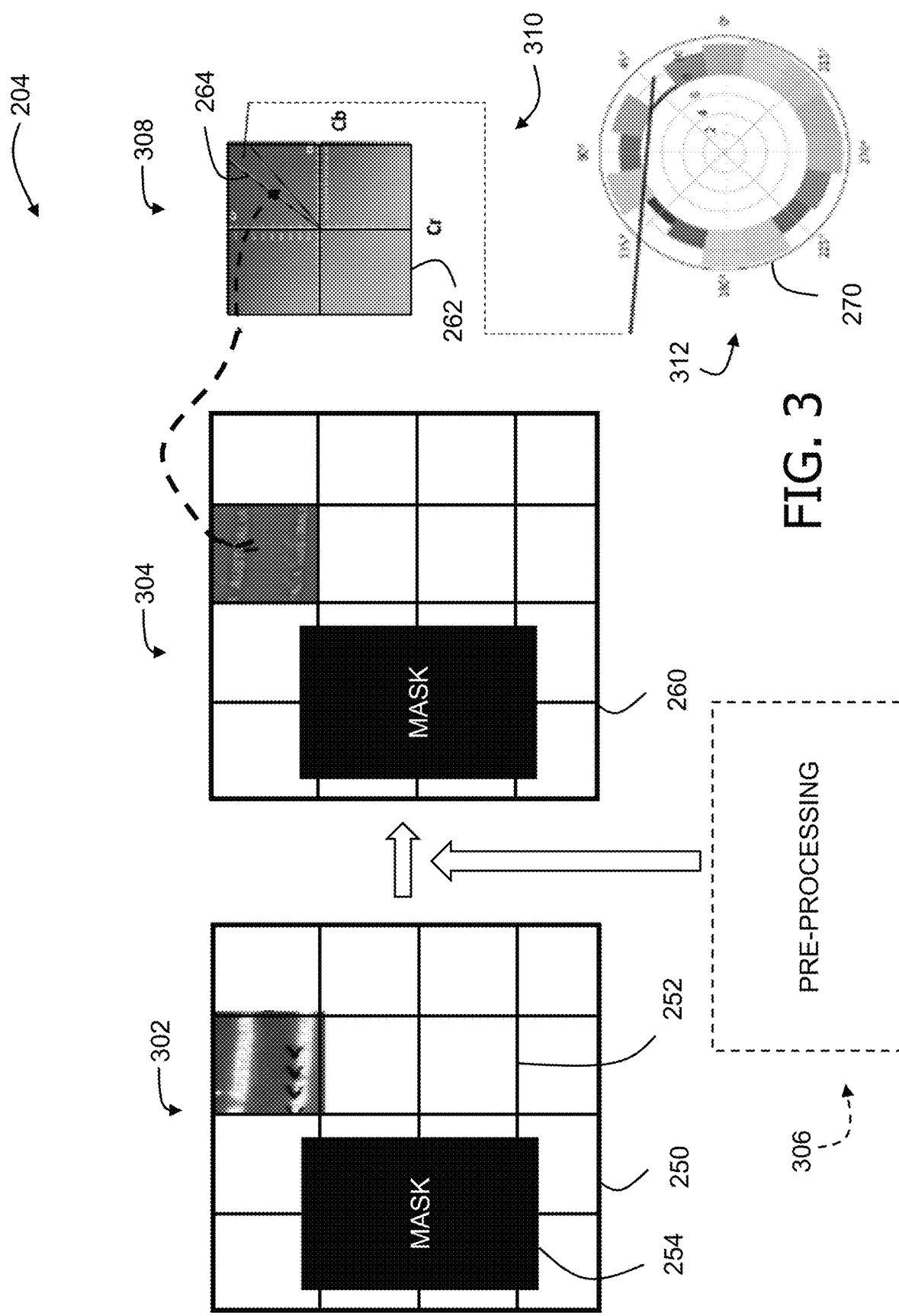
FIG. 3 is a schematic block diagram illustrating an example embodiment of a process for generating document color profile descriptors.

Document profiling engine 126 processes (204) first image to generate a subject document template, including color profile descriptors for each of a plurality of ROIs 252. Processing (204) is shown in greater detail in FIG. 3. In particular, document profiling engine 126 divides (302) first image 250 into a plurality of ROIs 252 and applies a mask 254 to personalized information that is irrelevant for document authentication (e.g., portrait, personal details, etc.). In one example embodiment, document profiling engine 126 divides (302) first image 250 into 16 ROIs (e.g., in a 4×4 grid). In such an embodiment, the ROIs do not overlap. However, in other embodiments, document profiling engine 126 divides (302) first image 250 into any other number, shape, or configuration of ROIs. For example, first image 250 can be divided into ROIs of different shapes, or into multiple layers of ROIs in different shapes, numbers, or orientations. Notably, however, the definitions of ROIs in an enrolled document template and a subject document template being compared should be the same.

Document profiling engine 126 subsequently transforms (304) first image 250 of the subject document to a second image 260 of the subject document, second image 260 depicting the subject document illuminated by the UV light in a second, YCbCr color space. In some embodiments, transforming (304) occurs prior to dividing (302) without departing from the scope of the present disclosure. First and second image 250, 260 include the same number and placement of ROIs 252.

In some embodiments, document profiling engine 126 may also perform additional processing steps (referred to as "preprocessing", 306), before, during, or after dividing (302) and/or transforming (304). In some such embodiments, preprocessing (306) includes optical character recognition (OCR) and portrait detector, or other text/image processing; eliminating detected personal or non-background information from further analysis, such as generating mask 254; document normalization, including flattening and re-sizing the image (e.g., either first image 250 or second image 260); and/or white-balancing the image. In some specific cases, pre-processing (306) includes blocking or masking the portrait area and personally identifiable information (PII) in images and/or text. Notably, these areas of small, personalized text are generally averaged with surrounding pixels, so would not be useful in the template generation or matching processes of the present disclosure.

Document profiling engine 126 analyzes and processes each ROI 252 of second image 260. In particular, document profiling engine generates (308) a color profile descriptor for each ROI 252. Generating (308) may include validating each ROI 252 and/or each pixel within each ROI 252. Validating ROIs 252 may include computing an average pixel intensity for an ROI 252, determining that the average pixel intensity falls within a range bounded by a dark-current threshold and a saturation threshold, as described above. When the average pixel intensity does fall within this range, an ROI 252 is considered valid. For each valid ROI 252, document profiling engine 126 determines a count of valid pixels, or those count of pixels whose intensity also falls within the range bounded by the dark-current threshold and the saturation threshold, and if the count of valid pixels exceeds a threshold, ROI 252 is further validated and usable for matching. Document profiling engine 126 may also determine other intensity-related values for an ROI 252 and/or the pixels therein, such as a maximum and minimum pixel intensity for each ROI 252.

Generating (308) also includes generating color histograms (also referred to as polar histograms) for each ROI 252. Document profiling engine 126 accesses a CbCr color map 262 that is divided into angular sectors 264. In the example embodiment, CbCr color map 262 is divided into 16 angular sectors 264. For each valid pixel in an ROI 252, document profiling engine 126 maps (310) the pixel to a corresponding sectors 264, based on its two-coordinate [Cb, Cr] color. An associated color histogram 270 is divided into an equal number of bins as there are angular sectors 264. Document profiling engine 126 generates (312) the color histogram 270 by incrementing the corresponding bin of color histogram 270 for each mapped (310) pixel. In the example embodiment, color histogram 270 is a polar histogram and includes 16 bins, corresponding to the 16 sectors of CbCr color map 262. Once every pixel is mapped (310), the resulting color histogram 270 characterizes the overall color profile of the associated ROI 252.

Therefore, in the example embodiment, generating (308) includes generating (308), for each ROI 252, a respective color profile descriptor including first data elements and second data elements. The first data elements represent the color histogram 270 for the corresponding ROI 252, and the second data elements represent intensity characteristics of ROI 252. The color profile descriptors for all ROIs 252 are combined (e.g., concatenated) to generate a subject document template 280 (see FIG. 2) for the subject document. In one example embodiment, subject document template 280 includes at least 256 first data elements or values (i.e., 16 values representing color histogram 270 for each of the 16 ROIs 252). Subject document template 280 further includes at least 16 second data elements or values (i.e., at least an average intensity for each of the 16 ROIs 252).

Returning to FIG. 2, once processing (204) is complete—that is, document profile engine 126 has generated subject document template 280—process 200 further includes generating (206) a matching score between subject document template 280 and an enrolled document template 120. In the example embodiment, the matching score is generated (206) based on a comparison of the color profile descriptor for each ROI 252 to a corresponding ROI of enrolled document template 120. In particular, the color profile descriptor 252 for each ROI is a histogram-based feature, as described herein, that is normalized to have the same population (that is, the number of pixels over a single ROI 252). Therefore, these histogram-based descriptors are appropriately compared between document templates, even where either an enrolled document template and/or a subject template have one or more invalid ROIs 252 (that is, a null or empty histogram for that corresponding ROI 252). In the example embodiment, generating (206) is performed by document profiling engine 126. In one embodiment, document profiling engine 126 retrieves at least one enrolled document template 120 for comparison to subject document template 280, for example, from database 106.

Figure 4:
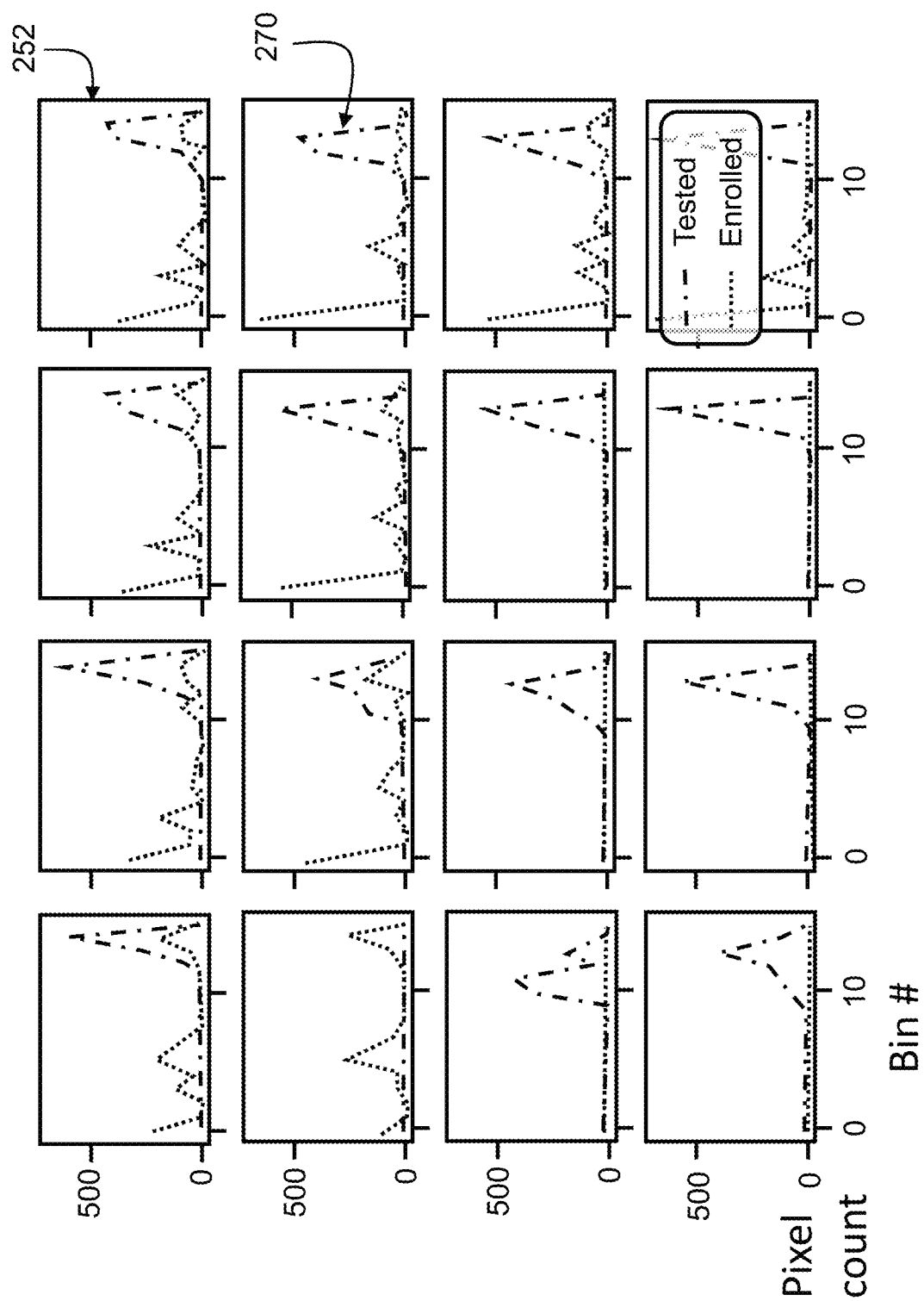
FIG. 4 is an illustrative example of subject document template and enrolled document template comparison.

Generating (206) the matching score includes, for each ROI 252 of the subject document, computing, using the first data elements (e.g., color data represented by the color histogram 270) of the corresponding color profile descriptor, a normalized initial score of the overlap between color histogram 270 of the ROI 252 and the respective color histogram of the corresponding ROI of enrolled document template 120. This comparison is graphically illustrated in FIG. 4, in which the color histograms 270 for each ROI 252 for the subject document and the enrolled document are shown. Document profiling engine 126, for each ROI 252, adjusts the initial score using the second data elements in the corresponding color profile descriptor. In one embodiment, this adjusting includes determining a difference between the maximum pixel intensity and minimum pixel intensity for the ROI 252, and subtracting the difference from the initial normalized score. Thereafter, the resulting adjusted scores are sorted in increasing order.

Document profiling engine 126 removes at least the highest adjusted score and at least the lowest adjusted score from further computations. In one example embodiment, the top two highest scores and the bottom four lowest scores are removed. With respect to images of documents illuminated by UV lighting in particular, over-saturation (e.g., brightness) is expected. In these cases, the match score may be zero; any scores of zero are additionally eliminated from further computations. This elimination feature accounts for inconsistencies in document images, such as unusually light or shadowy sections in an image of a subject document, which enhances the accuracy of authentication process 200. In one example embodiment, a minimum of seven adjusted match scores must remain for further computation.

Thereafter, document profiling engine 126 computes an overall matching score (between subject document template 280 and enrolled document template 120) as the mean of all remaining (ROI) match scores. This final value, the overall matching score, is compared (208) to a predetermined threshold value. If the matching score is higher than the threshold value, the subject document is considered authenticated. In contrast, if the matching score is less than the threshold value, the subject document is considered invalid or is not authenticated. Document profiling engine 126 generates an authentication response (e.g., "yes" or "no," or other binary response values) that is returned to client device 102.

Embodiments of the systems and methods described herein thus facilitate authentication and/or validation of a credential document. Specifically, in these embodiments, the credential document is authentic by analyzing an image of the document illuminated by UV light. A template of the subject document is generated for comparison to an exemplar, or enrolled document template. Similar analyses are performed to generate the enrolled document templates and the templates of subject documents for subsequent comparison. The document templates include color profiles, including color and intensity data, that characterize the depicted document, as illuminated by UV light, in a transformed color space.

The systems and methods described herein may be implemented using computer programming or engineering techniques including computer software, firmware, hardware or any combination or subset thereof, wherein the technical effects and specific improvements to the technology and technical field may include one or more of: (i) improved accuracy of document authentication/validation; (ii) authentication processing that is device-agnostic and applicable across device variations; (iii) authentication processing that tolerates the wide variations on ambient illumination either globally or locally when comparing two color profiles between documents of the same jurisdiction class; (iv) minimizing authentication positive/negative bias without requiring any absolute standard of color balance through the use of color profile comparison; (v) document authentication based on background information, not personalized information; (vi) drop-out or elimination of highest/lowest ROI matching scores to account for outlier image characteristics; (vii) reduced sensitivity to illumination characteristics and variations; (viii) improved accuracy over analysis of documents in visible light due to the incorporation of local intensity information, and (ix) realizing any/all of the above benefits with an authentication process requiring low processing and storage capability, for efficient and fast document authentication.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is generally not intended to imply certain embodiments require at least one of X, at least one of Y, and at least one of Z to each be present. Additionally, conjunctive language such as the phrase "at least one of X, Y, and Z," unless specifically stated otherwise, should be understood to mean any combination of at least one of X, at least one of Y, and at least one of Z.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for authenticating a subject identification document, the system comprising:
    a memory comprising a first memory section storing computer-executable instructions and a second memory section storing a plurality of enrolled document templates; and
    a processor in communication with the memory and configured to execute the computer-executable instructions that, when executed, cause the processor to:
        receive a first image of the subject identification document, the first image depicting, in a red-green-blue (RGB) color space, the subject identification document illuminated by ultraviolet (UV) light;
        transform the first image of the subject document to a second image of the subject identification document in a YCbCr color space;
        divide the second image into a plurality of regions of interest (ROIs);
        for each ROI, apply a mask based on at least one of a dark current threshold or a saturation threshold to produce a masked ROI by eliminating individual pixels having corresponding values that fall outside the at least one of the dark current threshold or the saturation threshold, generate a color profile descriptor including first data elements associated with a number of pixels in each of a plurality of angular sectors in a CbCr color map of the YCbCr color space, within the corresponding masked ROI, and second data elements associated with pixel intensity of the pixels within the corresponding masked ROI;
        generate a matching score for the second image based on a comparison of the color profile descriptor for each masked ROI obtained by eliminating individual pixels having corresponding values that fall outside the at least one of the dark current threshold or the saturation threshold to a corresponding ROI of a first enrolled document template; and
        compare the matching score to a threshold to determine whether the subject identification document is authenticated.

2. The system of claim 1, wherein the computer-executable instructions, when executed, further cause the processor to generate the color profile descriptor for a first ROI of the plurality of ROIs by:
    dividing the CbCr color map into the plurality of angular sectors;
    mapping each pixel in the first ROI to a corresponding one of the angular sectors; and
    incrementing a corresponding sector of a color histogram based on each mapped pixel.

3. The system of claim 2, wherein the computer-executable instructions, when executed, further cause the processor to generate the matching score for the second image by:
    for each ROI of the plurality of ROIs:
        computing, using the first data elements of the corresponding color profile descriptor, a normalized initial score of overlap between the color histogram of the ROI and the respective color histogram of the corresponding ROI of the first enrolled document template; and
        adjusting the initial score using the second data elements in the corresponding color profile descriptor; and
    computing the matching score as a mean of the adjusted scores.

4. The system of claim 3, wherein the computer-executable instructions, when executed, further cause the processor to generate the matching score for the second image by:
    sorting the adjusted scores in increasing order; and
    removing at least the highest adjusted score and at least the lowest adjusted score; and
    computing the matching score as the mean of only the remaining adjusted scores.

5. The system of claim 1, wherein the computer-executable instructions, when executed, further cause the processor to:
    validate each ROI prior to generating the color profile descriptor for the corresponding ROI; and
    only generate the color profile descriptor for valid ROIs of the plurality of ROIs.

6. The system of claim 5, wherein the computer-executable instructions, when executed, further cause the processor to validate a first ROI by:
    computing an average pixel intensity for the first ROI; and
    determining that the average pixel intensity falls within a range bounded by the at least one of the dark-current threshold and the saturation threshold.

7. The system of claim 6, wherein the computer-executable instructions, when executed, further cause the processor to further validate the first ROI by:
    determining a count of valid pixels within the first ROI; and
    determining the count of valid pixels exceeds a present threshold.

8. The system of claim 1, wherein the computer-executable instructions, when executed, further cause the processor to generate each enrolled document template by:
    receiving a first image of a corresponding enrollment document, the first image depicting, in the RGB color space, the enrollment document illuminated by UV light;
    transforming the first image of the enrollment document to a second image of the enrollment document, the second image depicting, in the YCbCr color space, the enrollment document illuminated by the UV light;
    dividing the second image of the enrollment document into a plurality of ROIs; and
    for each ROI of the enrollment document, generating the color profile descriptor.

9. The system of claim 1, wherein the computer executable instructions, when executed, further cause the processor to determine whether the subject document is authenticated by:
    comparing the matching score to a threshold associated with the first enrolled document template to determine whether the subject document is authenticated.

10. The system of claim 1, wherein the second image depicts, in the YCbCr color space, the subject identification document illuminated by the UV light.

11. A non-transitory, computer readable storage medium having a first memory section storing a plurality of enrolled document templates and a second memory section having instructions stored thereon that, in response to execution by a processor, cause the processor to:
    receive a first image of a subject identification document, the first image depicting, in a red-green-blue (RGB) color space, the subject identification document illuminated by ultraviolet (UV) light;
    transform the first image of the subject identification document to a second image of the subject identification document in a YCbCr color space;
    divide the second image into a plurality of regions of interest (ROIs);
    for each ROI, apply a mask based on at least one of a dark current threshold or a saturation threshold to produce a masked ROI by eliminating individual pixels having corresponding values that fall outside at least one of the dark current threshold or the saturation threshold, generate a color profile descriptor including first data elements associated with a number of pixels in each of a plurality of angular sectors in a CbCr color map of the YCbCr color space, within the corresponding masked ROI, and second data elements associated with pixel intensity of the pixels within the corresponding masked ROI;
    generate a matching score for the second image based on a comparison of the color profile descriptor for each masked ROI obtained by eliminating individual pixels having corresponding values that fall outside the at least one of the dark current threshold or the saturation threshold to a corresponding ROI of a first enrolled document template; and
    compare the matching score to a threshold to determine whether the subject identification document is authenticated.

12. The non-transitory, computer readable storage medium of claim 11, wherein the instructions further cause the processor to generate the color profile descriptor for a first ROI of the plurality of ROIs by:
    dividing the CbCr color map into the plurality of angular sectors;
    mapping each pixel in the first ROI to a corresponding one of the angular sectors; and
    incrementing a corresponding sector of a color histogram based on each mapped pixel.

13. The non-transitory, computer readable storage medium of claim 12, wherein the instructions further cause the processor to generate the matching score for the second image by:
    for each ROI of the plurality of ROIs:
        computing, using the first data elements of the corresponding color profile descriptor, a normalized initial score of overlap between the color histogram of the ROI and the respective color histogram of the corresponding ROI of the first enrolled document template; and
        adjusting the initial score using the second data elements in the corresponding color profile descriptor; and
    computing the matching score as a mean of the adjusted scores.

14. The non-transitory, computer readable storage medium of claim 13, wherein the instructions further cause the processor to generate the matching score for the second image by:
   sorting the adjusted scores in increasing order; and
   removing at least the highest adjusted score and at least the lowest adjusted score; and
   computing the matching score as the mean of only the remaining adjusted scores.

15. The non-transitory, computer readable storage medium of claim 11, wherein the instructions further cause the processor to:
   validate each ROI prior to generating the color profile descriptor for the corresponding ROI; and
   only generate the color profile descriptor for valid ROIs of the plurality of ROIs.

16. The non-transitory, computer readable storage medium of claim 15, wherein the instructions further cause the processor to validate a first ROI by:
   computing an average pixel intensity for the first ROI; and
   determining that the average pixel intensity falls within a range bounded by the at least one of the dark-current threshold and the saturation threshold.

17. The non-transitory, computer readable storage medium of claim 16, wherein the instructions further cause the processor to further validate the first ROI by:
   determining a count of valid pixels within the first ROI; and
   determining the count of valid pixels exceeds a present threshold.

18. A computer-implemented method for authenticating a subject identification document, the method implemented using an authentication system including (i) a memory storing a plurality of enrolled document templates, and (ii) a processor in communication with the memory, the method comprising:
   receiving a first image of the subject identification document, the first image depicting, in a red-green-blue (RGB) color space, the subject identification document illuminated by ultraviolet (UV) light;
   transforming the first image of the subject document to a second image of the subject identification document in a YCbCr color space;
   dividing the second image into a plurality of regions of interest (ROIs);
   for each ROI, applying a mask based on at least one of a dark current threshold or a saturation threshold to produce a masked ROI by eliminating individual pixels having corresponding values that fall outside the at least one of the dark current threshold or the saturation threshold, generating a color profile descriptor including first data elements associated with a number of pixels in each of a plurality of angular sectors in a CbCr color map of the YCbCr color space, within the corresponding masked ROI, and second data elements associated with pixel intensity of the pixels within the corresponding masked ROI;
   generating a matching score for the second image based on a comparison of the color profile descriptor for each masked ROI obtained by eliminating individual pixels having corresponding values that fall outside at least one of the dark current threshold or the saturation threshold to a corresponding ROI of a first enrolled document template; and
   comparing the matching score to a threshold to determine whether the subject identification document is authenticated.

19. The computer-implemented method of claim 18, wherein generating the color profile descriptor for a first ROI of the plurality of ROIs comprises:
   dividing the CbCr color map into the plurality of angular sectors;
   mapping each pixel in the first ROI to a corresponding one of the angular sectors; and
   incrementing a corresponding sector of a color histogram based on each mapped pixel.

20. The computer-implemented method of claim 19, wherein generating the matching score for the second image comprises:
   for each ROI of the plurality of ROIs:
      computing, using the first data elements of the corresponding color profile descriptor, a normalized initial score of overlap between the color histogram of the ROI and the respective color histogram of the corresponding ROI of the enrolled document template; and
      adjusting the initial score using the second data elements in the corresponding color profile descriptor; and
   computing the matching score as a mean of the adjusted scores.

* * * * *